(12) United States Patent
Gong et al.

(10) Patent No.: US 9,956,986 B2
(45) Date of Patent: May 1, 2018

(54) AUTOMOBILE STEERING SYSTEM

(71) Applicant: SHENZHEN ZHILUN DRIVING TECHNOLOGY FOR ELECTRIC VEHICLE CO., LTD., Guangdong (CN)

(72) Inventors: Shugang Gong, Guangdong (CN); Lingliang Hu, Guangdong (CN); Jigao Zhao, Guangdong (CN); Jinjun He, Guangdong (CN); Xiurong Wu, Guangdong (CN)

(73) Assignee: SHENZHEN ZHILUN DRIVING TECHNOLOGY FOR ELECTRIC VEHICLE CO., LTD., Shenzhen (CN)

( * ) Notice: Subject to any disclaimer, the term of this patent is extended or adjusted under 35 U.S.C. 154(b) by 84 days.

(21) Appl. No.: 15/300,498

(22) PCT Filed: Apr. 1, 2014

(86) PCT No.: PCT/CN2014/074540
§ 371 (c)(1),
(2) Date: Sep. 29, 2016

(87) PCT Pub. No.: WO2015/149279
PCT Pub. Date: Oct. 8, 2015

(65) Prior Publication Data
US 2017/0120946 A1    May 4, 2017

(51) Int. Cl.
*B62D 3/02* (2006.01)
*B62D 5/04* (2006.01)
(Continued)

(52) U.S. Cl.
CPC ............... *B62D 3/02* (2013.01); *B62D 5/046* (2013.01); *B62D 7/023* (2013.01); *B62D 7/02* (2013.01); *B62D 7/026* (2013.01); *B62D 7/08* (2013.01)

(58) Field of Classification Search
CPC .......... B62D 3/02; B62D 5/046; B62D 7/023; B62D 7/02; B62D 7/026; B62D 7/08
See application file for complete search history.

(56) References Cited

U.S. PATENT DOCUMENTS 3,669,466 A * 6/1972 Spence .................... B62D 3/02
180/409
8,152,183 B1 * 4/2012 Bell .......................... B62D 3/02
280/771

(Continued)

FOREIGN PATENT DOCUMENTS

CN    102256831 A    11/2011
CN    202320495 U    7/2012
(Continued)

OTHER PUBLICATIONS

International Search Report of PCT/CN2014/074540 dated Dec. 1, 2014.
(Continued)

*Primary Examiner* — Kevin Hurley
*Assistant Examiner* — Marlon A Arce
(74) *Attorney, Agent, or Firm* — Hauptman Ham, LLP

(57) ABSTRACT

An automobile steering system for controlling the steering of left and right front wheels of an automobile, a left support shaft being provided on the left front wheel, and a right support shaft being provided on the right front wheel, the automobile steering system having a steering wheel, a steering transmission device, a left rotary table, a right rotary table and a steering device, wherein the steering wheel is connected to one end of the steering transmission device, and the other end of the steering transmission device is jointed with the steering device; the left and right rotary tables are respectively located at two ends of the steering device, the left rotary table being connected to the left support shaft, and the right rotary table being connected to (Continued)

the right support shaft; and the steering device has a left steel wire rope, a right steel wire rope and a synchronous belt, two ends of the left steel wire rope are respectively wound around the left rotary table and the synchronous belt, and two ends of the right steel wire rope are respectively wound around the right rotary table and the synchronous belt. The steering system cleverly adopts the steel wire ropes for the steering control of the wheels, has a simple structure, low manufacturing difficulty, low manufacturing costs and high accuracy, and is especially suitable for use in an electric vehicle.

10 Claims, 6 Drawing Sheets

(51) Int. Cl.
*B62D 7/02* (2006.01)
*B62D 7/08* (2006.01)

(56) References Cited

U.S. PATENT DOCUMENTS

| | | | |
|---|---|---|---|
| 9,694,848 B1* | 7/2017 | Ostlie | B62D 7/06 |
| 2005/0072621 A1* | 4/2005 | Hara | B62D 1/163 |
| | | | 180/444 |
| 2006/0272882 A1* | 12/2006 | Chino | B62D 1/163 |
| | | | 180/405 |
| 2015/0008653 A1* | 1/2015 | Burns, Jr. | B62D 3/02 |
| | | | 280/93.512 |

FOREIGN PATENT DOCUMENTS

| | | |
|---|---|---|
| CN | 202624347 U | 12/2012 |
| DE | 19941535 A1 | 3/2001 |
| EP | 1254825 A2 | 11/2002 |
| KR | 20070001857 A | 1/2007 |

OTHER PUBLICATIONS

Espacenet bibliographic data for KR Publication No. 20070001857 published Jan. 4, 2007, 1 page.
Espacenet bibliographic data for DE Publication No. 19941535 published Mar. 22, 2001, 1 page.
Espacenet bibliographic data for CN Publication No. 202624347 published Dec. 26, 2012, 1 page.
Espacenet bibliographic data for CN Publication No. 203320495 published Jul. 11, 2012, 1 page.
Espacenet bibliographic data for CN Publication No. 102256831 published Nov. 23, 2011, 1 page.
Espacenet bibliographic data for EP Publication No. 1254825 published Nov. 6, 2002, 1 page.

* cited by examiner

AUTOMOBILE STEERING SYSTEM

TECHNICAL FIELD

The present application relates to the technical field of automobiles, and more particularly, relates to an automobile steering system.

BACKGROUND

Structural features of a traditional automobile steering system are embodied in that two ends of a front axle are provided with two steering knuckles, which are connected together by a master pin with an inward inclined angle; the front axle is further provided with a trapezoidal mechanism for steering. The aforesaid structure is complex, has a low flexibility, is unsuitable for an assembly of specific wheel hub electric motors and vehicle wheels, and is particularly unsuitable for the use of an electric vehicle. In addition, since a traditional automobile steering system has a complex structure, its manufacturing difficulty is large, and its manufacturing cost is high. It can be seen that the traditional automobile steering system has seriously restricted the development of automobiles (especially electric vehicles).

Technical Problem

A purpose of the present invention is to overcome the defects in the prior art and thus provide an automobile steering system having a simple structure and steering accurately, wherein the automobile steering system can also achieve reverse steering.

Technical Solution

The present invention is implemented as follows: an automobile steering system configured for controlling steering of a left front wheel and a right front wheel of an automobile, the left right wheel is provided with a left support shaft, the right front wheel is provided with a right support shaft; wherein the automobile steering system comprises a steering wheel, a steering transmission device configured for transferring a rotational angle of the steering wheel, a left rotary table configured for regulating a rotational angle of the left front wheel, a right rotary table configured for regulating a rotational angle of the right front wheel, and a steering device configured for controlling rotational angles of the left rotary table and the right rotary table;

the steering wheel is connected with one end of the steering transmission device, and another end of the steering transmission device engages with the steering device; the left rotary table and the right rotary table are arranged at two ends of the steering device respectively; the left rotary table is connected with the left support shaft, and the right rotary table is connected with the right support shaft;

the steering device comprises a left steel wire rope, a right steel wire rope and a synchronous belt driven to rotate by the steering transmission device; two ends of the left steel wire rope are coiled around the left rotary table and the synchronous belt respectively, and two ends of the right steel wire rope are coiled around the right rotary table and the synchronous belt respectively.

Furthermore, the steering device further comprises a left synchronous belt locking piece configured for clamping the left steel wire rope on the synchronous belt or releasing the left steel wire rope from the synchronous belt, and a right synchronous belt locking piece configured for clamping the right steel wire rope on the synchronous belt or releasing the right steel wire rope from the synchronous belt; both the left synchronous belt locking piece and the right synchronous belt locking piece are arranged on the synchronous belt; the steering wheel is provided thereon with a control device configured for controlling the left synchronous belt locking piece and the right synchronous belt locking piece.

Furthermore, the left synchronous belt locking piece comprises a left clamping block configured for clamping the left steel wire rope on the synchronous belt and a left electromagnet configured for controlling a clamping state and a release state of the left clawing block, and the left electromagnet is arranged on the left clamping block; the right synchronous belt locking piece comprises a right clamping block configured for clamping the right steel wire rope on the synchronous belt and a right electromagnet configured for controlling a clamp state and a release state of the right clamping block, and the right electromagnet is arranged on the right clamping block.

Specifically, the steering device further comprises an intermediate locking piece configured for controlling a distance between the left synchronous belt locking piece and the right synchronous belt locking piece simultaneously; the intermediate locking piece is arranged on the synchronous belt and placed between the left synchronous belt locking piece and the right synchronous belt locking piece, and both the left synchronous belt locking piece and the right synchronous belt locking piece are connected with the intermediate locking piece through an intermediate steel wire rope.

More specifically, the intermediate locking piece comprises a scroll and an intermediate electromagnet, the intermediate electromagnet is arranged on the scroll, and the intermediate steel wire rope is coiled around the scroll.

Further, the steering transmission device comprises an upper transmission shaft and a lower transmission shaft, an upper end of the upper transmission shaft is connected with the steering wheel, a lower end of the upper transmission shaft is connected with an upper end of the lower transmission shaft, and a lower end of the lower transmission shaft matches with and is connected with the synchronous belt.

Furthermore, the lower end of the lower transmission shaft is provided with transmission gears, and the synchronous belt is provided thereon with waved gears meshing with the transmission gears.

Specifically, the automobile steering system further comprises a left electric motor and a right electric motor, the left rotary table is connected with the left support shaft through the left electric motor, and the right rotary table is connected with the right support shaft through the right electric motor.

More specifically, the steering wheel is provided thereon with a control device configured for controlling the left electric motor and the right electric motor.

Particularly, the steering wheel is further provided thereon with a control device configured for taking an overall control, and the control device comprises buttons and a display screen.

Advantageous Effects of the Present Invention

The automobile steering system provided by the present invention has the following technical effects:

In the present invention, the synchronous belt matches with the steering transmission device; by skillfully using the steel wire ropes (the left steel wire rope and the right steel wire rope) and winding manners thereof, the left rotary table and the right rotary table can be accurately driven to rotate, and the rotational angles of the left front wheel and the right front wheel can be respectively accurately controlled through the left rotary table and the right rotary wheel. In addition, the present invention can also achieve a reverse rotation effect similar to that of existing automobile steering systems. The present invention has a simple structure, a low manufacturing difficulty, low manufacturing cost, and a high accuracy; is convenient for assemblies of automobiles and wheels thereof, and is particularly suitable for electric vehicles.

DETAILED DESCRIPTION OF THE PREFERRED EMBODIMENT

In order to make the purposes, technical solutions, and advantages of the present invention be clearer and more understandable, the present invention will be further described in detail hereinafter with reference to the accompanying drawings and embodiments. It should be understood that the embodiments described herein are only intended to illustrate but not to limit the present invention.

Figure 1:
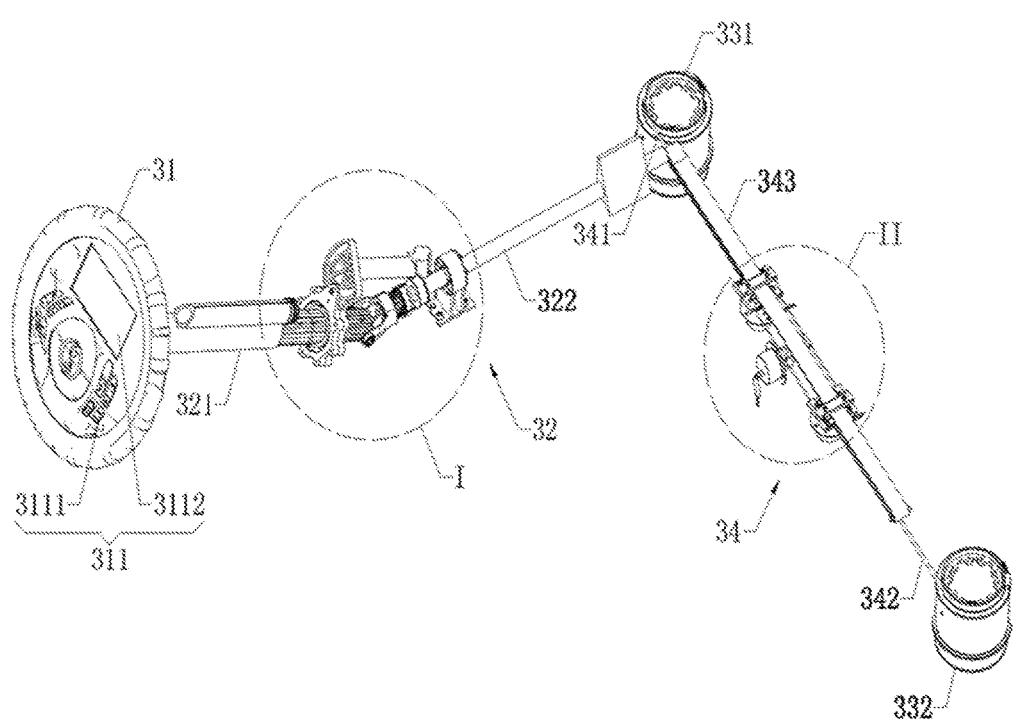
FIG. 1 illustrates a top perspective view of an automobile steering system provided by an embodiment of the present invention.
Figure 2:
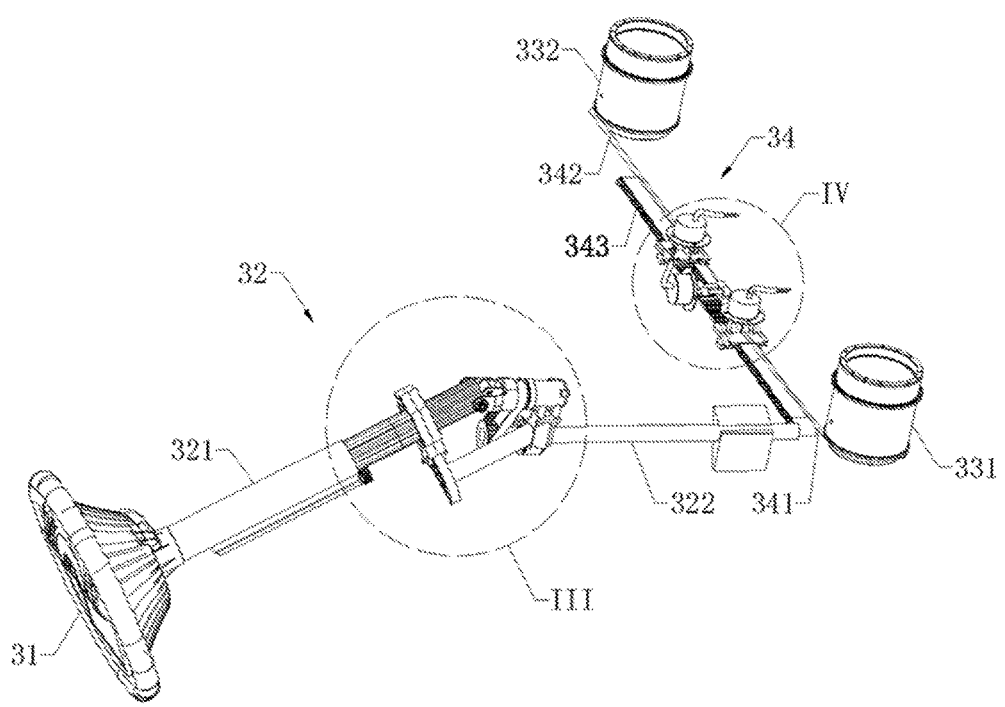
FIG. 2 illustrates a bottom perspective view of the automobile steering system provided by the embodiment of the present invention.

Referring to FIG. 1 and FIG. 2, an embodiment of the present invention provides an automobile steering system, which is configured for controlling steering of a left front wheel and a right front wheel of an automobile. The left front wheel is provided with a left support shaft, and the right front wheel is provided with a right support shaft (not shown in the figures); the automobile steering system comprises a steering wheel 31, a steering transmission device 32 configured for transferring a rotational angle of the steering wheel 31, a left rotary table 331 configured for regulating a rotational angle of the left front wheel, a right rotary table 332 configured for regulating a rotational angle of the right front wheel, and a steering device 34 configured for controlling rotational angles of the left rotary table 331 and the right rotary table 332.

The steering wheel 31 is connected with one end of the steering transmission device 32, and another end of the steering transmission device 32 engages with the steering device 34; the left rotary table 331 and the right rotary table 332 are arranged at two ends of the steering device 34 respectively, wherein the left rotary table 331 is connected with the left support shaft, and the right rotary table 332 is connected with the right support shaft.

The steering device 34 comprises a left steel wire rope 341, a right steel wire rope 342 and a synchronous belt 343 driven to rotate by the steering transmission device 32; two ends of the left steel wire rope 341 are coiled around the left rotary table 331 and the synchronous belt 343 respectively, and two ends of the right steel wire rope 342 are coiled around the right rotary table 332 and the synchronous belt 343 respectively.

When the steering wheel 31 is rotated, a rotational angle thereof is transferred to the synchronous belt 343 through the steering transmission device 32, the synchronous belt 343 drives the left steel wire rope 341 and the right steel wire rope 342 to transmit forces simultaneously, and thus the left steel wire rope 341 and the right steel wire rope 342 regulate the rotational angles of the left front wheel and the right front wheel respectively and simultaneously.

In the present invention, the synchronous belt 343 matches with the steering transmission device 32, by skillfully using the steel wire ropes (the left steel wire rope 341 and the right steel wire rope 342) and winding manners thereof, the left rotary table 331 and the right rotary table 332 can be accurately driven to rotate, and the rotational angles of the left front wheel and the right front wheel can be respectively accurately controlled through the left rotary table 331 and the right rotary wheel 332. In addition, the present invention can also achieve a reverse rotation effect similar to that of existing automobile steering systems. The present invention has a simplified structure, a low manufacturing difficulty, a low manufacturing cost and a high steering accuracy, and is convenient for assemblies of automobiles and wheels (wheel hubs) thereof, and is particularly suitable for electric vehicles.

Figure 4:
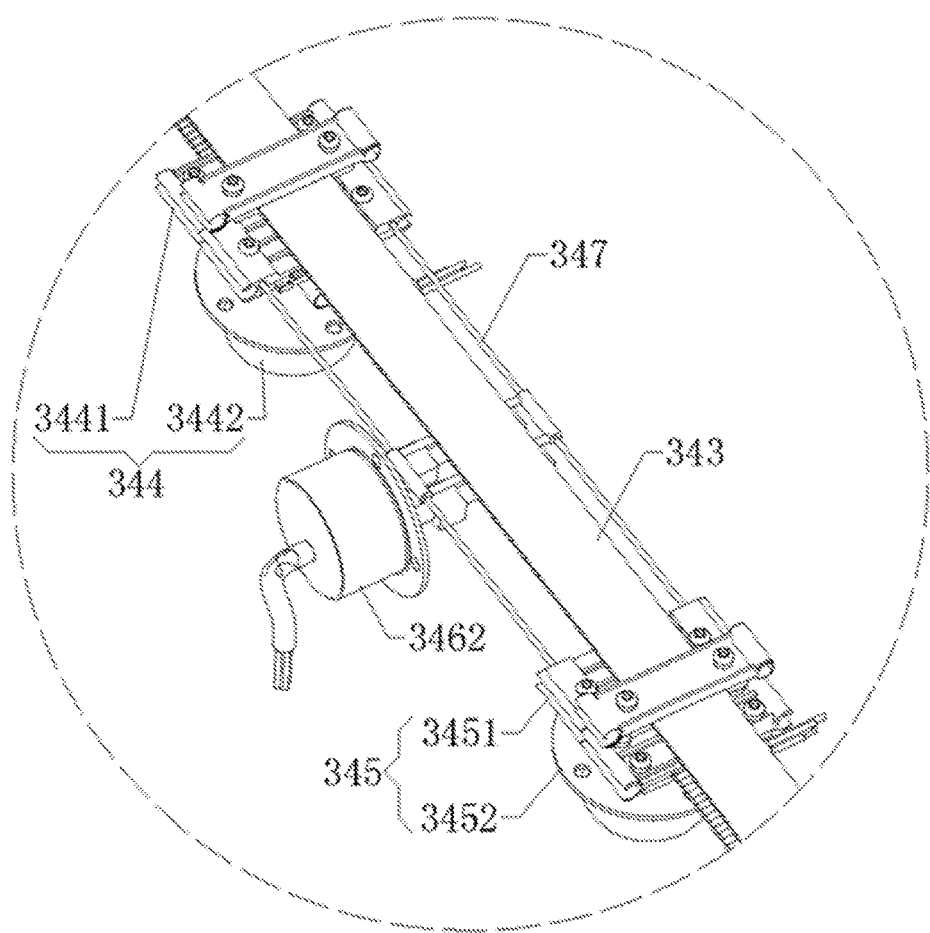
FIG. 4 illustrates a partially enlarged view of the part II in FIG. 1.
Figure 6:
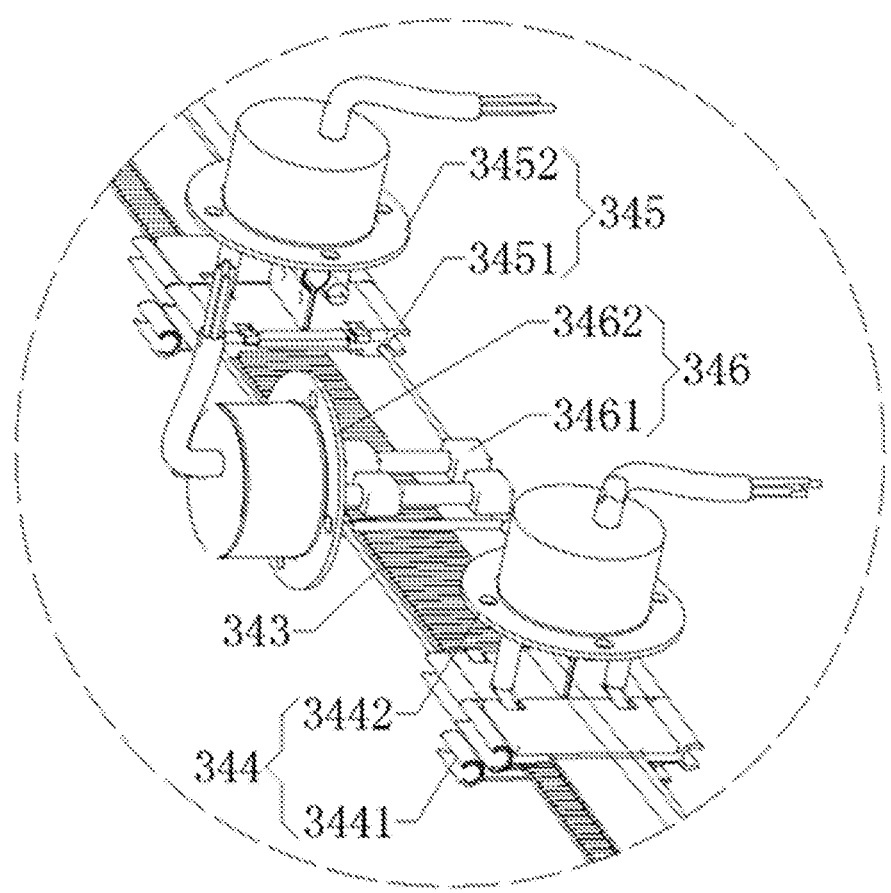
FIG. 6 illustrates a partially enlarged view of the part IV in FIG. 2.

Referring to FIG. 4 and FIG. 6, the steering device 34 further comprises a left synchronous belt locking piece 344 configured for clamping the left steel wire rope 341 on the synchronous belt 343 or releasing the left steel wire rope 341 from the synchronous belt 343, and a right synchronous belt locking piece 345 configured for clamping the right steel wire rope 342 on the synchronous belt 343 or releasing the right steel wire rope 342 from the synchronous belt 343; both the left synchronous belt locking piece 344 and the right synchronous belt locking piece 345 are arranged on the synchronous belt 343; the steering wheel 31 is provided thereon with a control device configured for controlling the left synchronous belt locking piece 344 and the right synchronous belt locking piece 345. When an automobile is conventionally used (i.e., the automobile is driven to move forward), the left synchronous belt locking piece 344 and the right synchronous belt locking piece 345 fix and clamp the left steel wire rope 341 and the right steel wire rope 342 on the synchronous belt 343 respectively. In this way, the automobile in the present invention can be manipulated to steer just like a traditional automobile. The steering wheel 31 rotates and drives the steel wire ropes to transmit forces through the synchronous belt 343, such that steering of the wheels can be controlled indirectly and accurately. When the automobile needs to be unconventionally used (i.e., the automobile is driven to move laterally by 90 degrees), a driver can manipulate the control device on the steering wheel 31, so that the left synchronous belt locking piece 344 and the right synchronous belt locking piece 345 release the steel wire rope 341 and the right steel wire rope 342 from the synchronous belt 343 respectively; at this moment, the steel wire ropes are not driven by the synchronous belt 343; the control device, through a program control, makes the left front wheel and the right front wheel be stretched outwardly respectively and finally form an included angle of 180 degrees, that is, the left front wheel and the right front wheel are collinear. It can be seen that the automobile can move laterally now, this driving manner is particularly suitable for parking, especially suitable for parking positions with narrow room. When a lateral driving terminates, by the control device, the left front wheel and the right front wheel are restored to their original positions respectively, and the left synchronous belt locking piece 344 and the right synchronous belt locking piece 345 clamp the steel wire ropes again; in this way, the automobile can return to a conventional driving state.

Please further refer to FIG. 4 and FIG. 6, as a specified embodiment relating to the left synchronous belt locking piece 344 and the right synchronous belt locking piece 345 of the present invention, the left synchronous belt locking piece 344 comprises a left clamping block 3441 configured to clamp the left steel wire rope 341 on the synchronous belt 343 and a left electromagnet 3442 configured to control a clamping state and a releasing state of the left clamping block 3441, and the left electromagnet 3442 is arranged on the left clamping block 3441; the right synchronous belt locking piece 345 comprises a right clamping block 3451 configured to clamp the right steel wire rope 342 on the synchronous belt 343 and a right electromagnet 3452 configured to control a clamping state and a releasing state of the right clamping block 3451, and the right electromagnet 3452 is arranged on the right clamping block 3451. In the form of the clamping blocks and the electromagnets cooperating with each other, the effects of clamping and releasing of the steel wire ropes can be achieved; such an implementation method is simple and easy to be realized.

Specifically, the steering device 34 further comprises an intermediate locking piece 346 configured for simultaneously controlling a distance between the left synchronous belt locking piece 344 and the right synchronous belt locking piece 345; the intermediate locking piece 346 is arranged on the synchronous belt 343 and placed between the left synchronous belt locking piece 344 and the right synchronous belt locking piece 345, both the left synchronous belt locking piece 344 and the right synchronous belt locking piece 345 are connected with the intermediate locking piece 346 through an intermediate steel wire rope 347. The intermediate locking piece 346 in the embodiment of the present invention can not only regulate the distance between the left synchronous belt locking piece 344 and the right synchronous belt locking piece 345 but also manipulate and control the steel wire ropes, for example, the intermediate locking piece 346 can indirectly control the rotational angles of the left rotation table 331 and the right rotation table 332, in other words, play an important role in a transition process between the aforesaid conventional driving and the lateral driving.

Referring to FIG. 6, as a specific implementation mode of the intermediate locking piece 346, the intermediate locking piece 346 comprises a scroll 3461 and an intermediate electromagnet 3462, wherein the intermediate electromagnet 3462 is arranged on the scroll 3461, and the intermediate steel wire rope 347 is coiled around the scroll 3461.

Figure 3:
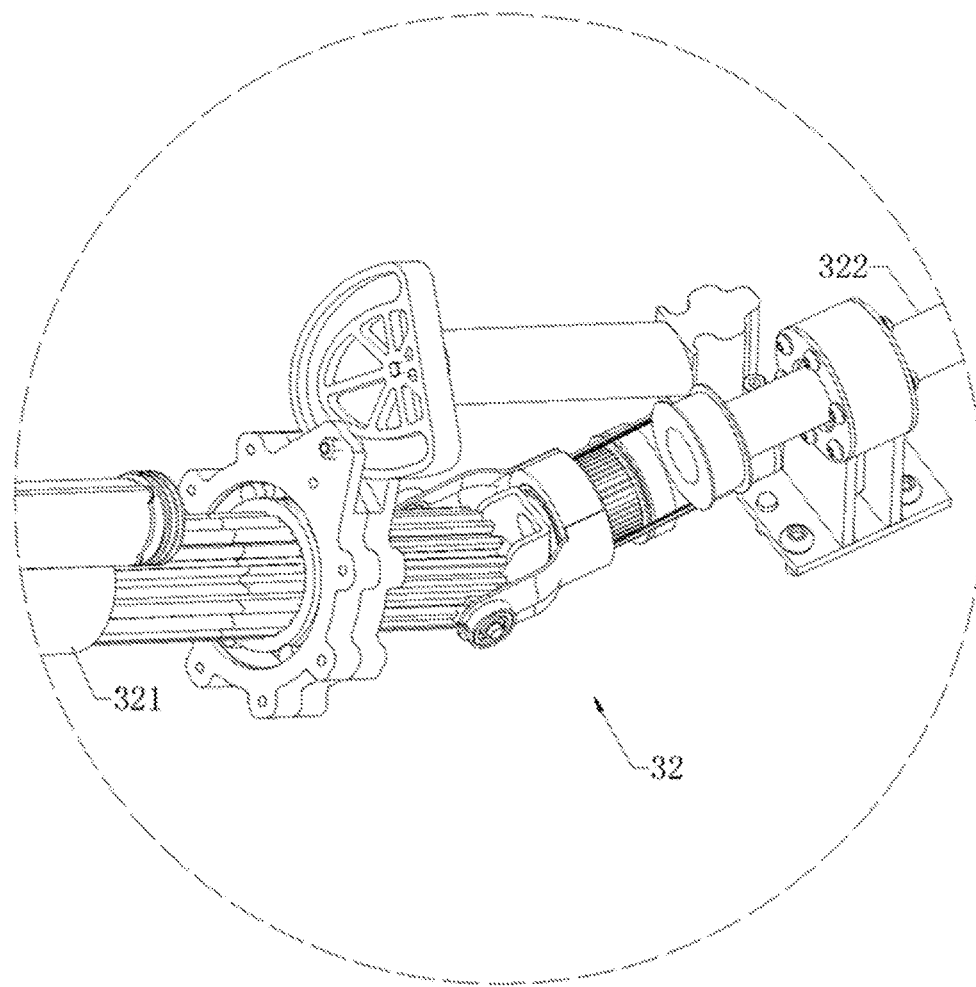
FIG. 3 illustrates a partially enlarged view of the part I in FIG. 1.
Figure 5:
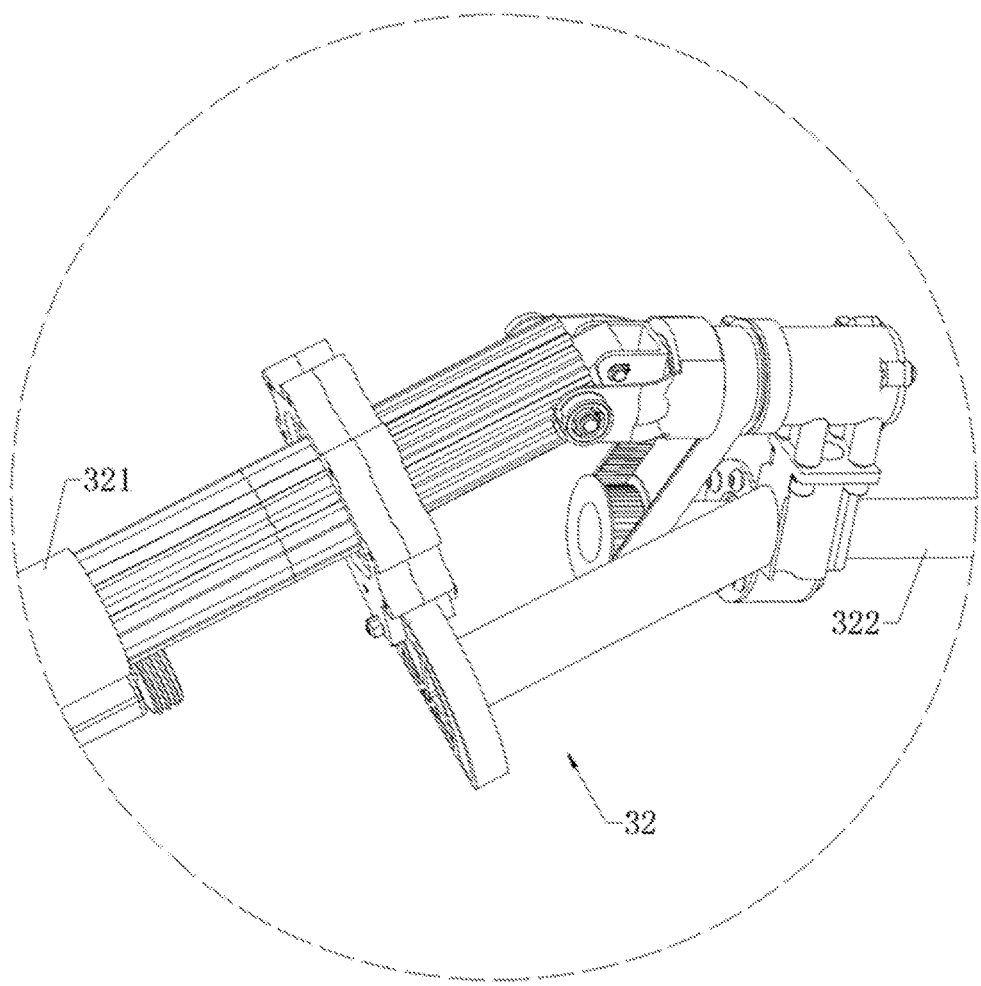
FIG. 5 illustrates a partially enlarged view of the part III in FIG. 2.

Please refer to FIG. 3 and FIG. 5, the steering transmission device 32 comprises an upper transmission shaft 321 and a lower transmission shaft 322, an upper end of the upper transmission shaft 321 is connected with the steering wheel 31, a lower end of the upper transmission shaft 321 is connected with an upper end of the lower transmission shaft 322, and a lower end of the lower transmission shaft 322 matches up and connects with the synchronous belt 343. Specifically, the steering transmission device 32 in the present invention can also be designed in accordance with a steering transmission device of an existing automobile, as long as transmission of the rotational angle of the steering wheel can be achieved.

Specifically, a lower end of the lower transmission shaft 322 is provided with transmission gears, and the synchronous belt 343 is provided thereon with waved gears meshing with the transmission gears.

Further, the automobile steering system provided by the embodiment of the present invention further comprises a left electric motor and a right electric motor (not shown in the figures), the left rotation table 331 is connected with the left support shaft through the left electric motor, and the right rotation table 332 is connected with the right support shaft through the right electric motor. The electric motors in the present invention can provide a power assistance function; specific arrangements of the left electric motor and the right electric motor can be made flexibly according to requirements, therefore, specific arrangement manners of the left electric motor and the right electric motor are not illustrated in the figures.

Furthermore, the steering wheel 31 is provided thereon with a control device con figured to control the left electric motor and the right electric motor. The left electric motor and the right electric motor are not only controlled directly by the left rotation table 331 and the right rotation table 332, but also controlled indirectly by the control device, such that the steering of the automobile is more accurate.

Referring back to FIG. 1, the steering wheel 31 is provided thereon with a control device 311 configured for taking an overall control, the control device 311 comprises buttons 3111 and a display screen 3112. Wherein, more specific structural designs and program control designs can be applied to the control device 311 according to requirements, and the control device 311 is not limited to its configuration shown in the figures, and therefore is not repeatedly described in this embodiment.

The aforementioned embodiments are only preferred embodiments of the present invention, and should not be regarded as being any limitation to the present invention. Any modification, equivalent replacement, improvement, and so on, which are made within the spirit and the principle of the present invention, should be included within the protection scope of the present invention.

The invention claimed is:

1. An automobile steering system configured for controlling a steering of a left front wheel and a right front wheel of an automobile, the left right wheel is provided with a left support shaft, the right front wheel is provided with a right support shaft; wherein: the automobile steering system comprises a steering wheel, a steering transmission device configured for transferring a rotational angle of the steering wheel, a left rotary table configured for regulating a rotational angle of the left front wheel, a right rotary table configured for regulating a rotational angle of the right front wheel, and a steering device configured for controlling rotational angles of the left rotary table and the right rotary table;

the steering wheel is connected with one end of the steering transmission device, and another end of the steering transmission device engages with the steering device; the left rotary table and the right rotary table are arranged at two ends of the steering device respectively; the left rotary table is connected with the left support shaft, and the right rotary table is connected with the right support shaft;

the steering device comprises a left steel wire rope, a right steel wire rope and a synchronous belt driven to rotate by the steering transmission device; two ends of the left steel wire rope are coiled around the left rotary table and the synchronous belt respectively, and two ends of the right steel wire rope are coiled around the right rotary table and the synchronous belt respectively.

2. The automobile steering system according to claim 1, wherein: the steering device further comprises a left synchronous belt locking piece configured for clamping the left steel wire rope onto the synchronous belt or releasing the left steel wire rope from the synchronous belt, and a right synchronous belt locking piece configured for clamping the right steel wire rope onto the synchronous belt or releasing the right steel wire rope from the synchronous belt, both the left synchronous belt locking piece and the right synchronous belt locking piece are arranged on the synchronous belt; the steering wheel is provided thereon with a control device configured for taking control of the left synchronous belt locking piece and the right synchronous belt locking piece.

3. The automobile steering system according to claim 2, wherein: the left synchronous belt locking piece comprises a left clamping block configured for clamping the left steel wire rope on the synchronous belt and a left electromagnet configured for controlling a clamping state or a release state of the left clamping block, and the left electromagnet is arranged on the left clamping block; the right synchronous belt locking piece comprises a right clamping block configured for clamping the right steel wire rope on the synchronous belt and a right electromagnet configured for controlling a clamping state or a release state of the right clamping block, and the right electromagnet is arranged on the right clamping block.

4. The automobile steering system according to claim 2, wherein: the steering device further comprises an intermediate locking piece configured for controlling a distance between the left synchronous belt locking piece and the right synchronous belt locking piece simultaneously; the intermediate locking piece is arranged on the synchronous belt and placed between the left synchronous belt locking piece and the right synchronous belt locking piece, and both the left synchronous belt locking piece and the right synchronous belt locking piece are connected with the intermediate locking piece through an intermediate steel wire rope.

5. The automobile steering system according to claim 4, wherein: the intermediate locking piece comprises a scroll and an intermediate electromagnet, the intermediate electromagnet is arranged on the scroll, and the intermediate steel wire rope is coiled around the scroll.

6. The automobile steering system according to claim 1, wherein: the steering transmission device comprises an upper transmission shaft and a lower transmission shaft, an upper end of the upper transmission shaft is connected with the steering wheel, a lower end of the upper transmission shaft is connected with an upper end of the lower transmission shaft, and a lower end of the lower transmission shaft matches with and is connected with the synchronous belt.

7. The automobile steering system according to claim 6, wherein: the lower end of the lower transmission shaft is provided with transmission gears, and the synchronous belt is provided thereon with waved gears meshing with the transmission gears.

8. The automobile steering system according to claim 1, further comprising: a left electric motor and a right electric motor, the left rotary table is connected with the left support shaft through the left electric motor, and the right rotary table is connected with the right support shaft through the right electric motor.

9. The automobile steering system according to claim 8, wherein: the steering wheel is provided thereon with a control device configured for controlling the left electric motor and the right electric motor.

10. The automobile steering system according to claim 1, wherein: the steering wheel is further provided thereon with a control device configured for taking an overall control, and the control device comprises buttons and a display screen.

* * * * *